United States Patent [19]
Beishline

[11] Patent Number: 5,856,618
[45] Date of Patent: Jan. 5, 1999

[54] POSITION SENSOR APPARATUS

[75] Inventor: Eric C. Beishline, Marlborough, Mass.

[73] Assignee: Texas Instruments Incorporated, Dallas, Tex.

[21] Appl. No.: 901,003

[22] Filed: Jul. 25, 1997

[51] Int. Cl.⁶ .................................................. G01M 19/00
[52] U.S. Cl. .......................................... 73/118.1; 338/131
[58] Field of Search ................................ 73/118.1, 865.8; 338/128–131; 324/691, 716; 74/335, 473.3, 473.33

[56] References Cited

U.S. PATENT DOCUMENTS

| | | | |
|---|---|---|---|
| 2,866,124 | 12/1958 | Giiuffrida et al. | 338/130 |
| 3,522,542 | 8/1970 | LaBude et al. | 338/131 |
| 3,597,717 | 8/1971 | Kent | 338/131 |
| 4,620,176 | 10/1986 | Hayes | 338/131 |
| 4,912,997 | 4/1990 | Malcolm et al. | 338/128 |

Primary Examiner—Robert Raevis
Attorney, Agent, or Firm—Russell E. Baumann; Richard L. Donaldson; Rene' E. Grossman

[57] ABSTRACT

A potentiometric position sensor (16, 40) is shown having first and second electrical contact wipers (24, 26; 24', 26') mechanically coupled to the control rod (14) of an automotive manual transmission. An electrical resistive circuit is formed on a flexible substrate (28, 28') which is mounted on the inside cylindrical surface (28a, 46a) of a housing (18, 46). The first contact wiper is adapted to wipe over a first set of resistive elements (28a, 28b, 28c; 28a', 28b', 28c') and the second contact wiper is adapted to wipe over a second set of resistive elements (28f, 28g, 28h; 28f', 28g', 28h) to provide unique analog voltage outputs dependent upon the position of the control rod along a translational and rotational axis (14a). In one embodiment the contact wipers (24, 26) are mounted on a rotor (22) which in turn is mounted directly on the control rod (14). In a second embodiment the contact wipers (24', 26') are mounted on a rotor (42) which is mechanically coupled to the control rod (14) via a ball and socket mechanism (48a, 50a).

6 Claims, 7 Drawing Sheets

FIG. 17 ions, 1, 2; 3, 4 or 5, R respectively, disposed in the
POSITION SENSOR APPARATUS This invention relates generally to sensor apparatus for providing an indication of the physical position of an element and more particularly to sensor apparatus for indicating both the translational and angular position of the control rod of a shift tower mechanism in a manual transmission of an automotive vehicle.

BACKGROUND OF THE INVENTION

It is known to provide an electrical signal indicative of the position of the detent lever used with an automatic transmission by linking contact strips in the form of a quadrant with contact wipers coupled to the detent lever so that selected angular movement of the detent lever caused by moving the shift selector will in turn result in the opening or closing of selected circuits to thereby provide an electrical signal corresponding the selected gear state. This signal is inputted to a microprocessor control in a known manner. With regard to manual transmissions, individual sensors could be used responsive to the respective translational and rotational position of a control rod of a manual transmission to provide separate outputs corresponding to their respective positions; however, there is a need to provide cross checking capability between the two outputs. As used herein, cross checking is the function of providing the position of the control rod on both the translational and the rotational axis from the output of either axis.

SUMMARY OF THE INVENTION

It is an object of the present invention to provide a sensor having an electrical output signal corresponding to the position, both translational and angular, of an element in any of various applications in general, and with regard to one specific application, of a control rod of an automotive manual transmission. Another object of the invention is the provision of apparatus for sensing the position of a control element which has cross checking capability and redundancy to enable continued operation in the event of certain fault conditions. Yet another object of the invention is the provision of reliable sensor apparatus having suitable life expectancy for use in an automotive manual transmission yet is relatively inexpensive.

Briefly, in a position sensor made in accordance with the invention, first and second electrically resistive patterns are disposed on the inside cylindrical surface of a housing and respective first and second electrically conductive contact wipers are mounted on a rotor which is rotatable about a longitudinal axis concentric with the longitudinal axis of the cylindrical surface and which is translatable along the longitudinal axis of the cylindrical surface with the first and second wipers wiping over the respective resistive patterns in dependence upon such rotational and translational movement. The position sensor is particularly suitable for use with an automotive manual transmission in which the control rod of the shift tower mechanism, in a first embodiment, is coaxial with and mounts thereon the rotor. A select pin extends generally perpendicularly to the longitudinal axis of the control rod and is received through an opening or cut-out in a shift gate plate restricting movement of the select pin to a preselected gear shift pattern. The opening in the shift gate plate is formed with a neutral zone along an X-axis with pairs of shift positions extending into notches in opposed directions therefrom along a Y-axis. Thus the control rod is movable along the X-axis with the pin moving in a neutral zone and the control rod is rotatable along a θ-axis with the pin moving into any selected gear position from a plurality of pairs of gear positions spaced along the X-axis, e.g., gear positions, 1, 2; 3, 4 or 5, R respectively, disposed in the Y-direction on opposite sides of the neutral zone. The electrically resistive pattern comprises first and second pluralities of elongated resistive elements formed on a flexible substrate mounted on the inside cylindrical surface of the housing which is attached to the shift tower mechanism. In the sensor of the first embodiment the first resistive pattern includes three serially connected elongated resistive elements extending in a first direction placed side by side over a selected width. A first contact pad, having a width essentially equal to the selected width of the first plurality of resistive elements, is disposed adjacent to a side of the pattern. A second contact pad having a selected height is disposed adjacent an opposite side of the first contact pad. Three serially connected resistive elements, having the same selected height as that of the second contact pad and extending in a Y-direction, are placed side by side adjacent to the second contact pad. The first and second contact wipers mounted on the rotor are spring biased toward the substrate with one end of each wiper in continuous, wiping electrical engagement with a respective contact pad and the other end of each wiper in engagement with a portion of the respective resistive pattern in dependence upon movement of the control rod. One contact wiper wipes along the central resistive element of one pattern in the neutral position while the select pin is moving along the X-axis with the other wiper moving in turn across the width of each of the resistive elements of the other pattern. When the select pin moves from the neutral zone in the Y-direction, i.e., the control rod rotates about the θ-axis, the said one wiper then moves out of electrical engagement with the central resistive element of the said one pattern and then moves into wiping engagement with one of the outer resistive elements while the said other wiper moves in continuous wiping engagement with one of the resistive elements of the said other pattern. Each resistive pattern is electrically connected between a supply voltage terminal and a ground terminal and each contact pad is electrically connected to a respective output terminal. The voltage output at each output pin varies between voltage supply and ground in dependence upon the position of the contact wiper and concomitantly the translational and angular position of the control rod thereby providing a unique output signal for any position over the shift pattern at each output pin with cross checking between the two. The contact wipers are preferably each provided with a plurality of contact fingers to provide redundant electrical engagement.

In a second embodiment the rotor is mounted for rotation and translation on a shaft which extends parallel to and spaced from the longitudinal axis of the control rod. The rotor is mechanically coupled to the control rod by a ball and socket arrangement in which the rotor slides along the length of the shaft with translational movement of the control rod in a one to one ratio and rotates in a direction opposite to the direction the control rod is rotated as the ball slides into and out of the socket during such rotation. The contact wipers are generally elongated elements having cantilever mounted opposite distal ends. In the first embodiment, the contact wipers are oriented on the rotor so that they extend in a direction generally perpendicular to the X-axis and the resistive patterns extend one behind the other in a direction around the periphery of the cylindrical inside surface of the housing. In the second embodiment the contact wipers are shown oriented on the rotor so that they each extend in a direction generally parallel to their respective primary axis and the resistive patterns are disposed adjacent one another in a direction extending around the periphery of the cylindrical inside surface of the housing.

BRIEF DESCRIPTION OF THE DRAWINGS

Other objects, features and advantages of the invention will be apparent from the following detailed description, taken in conjunction with the accompanying drawings wherein like reference numerals refer to like parts.

DESCRIPTION OF PREFERRED EMBODIMENTS

Figure 1:
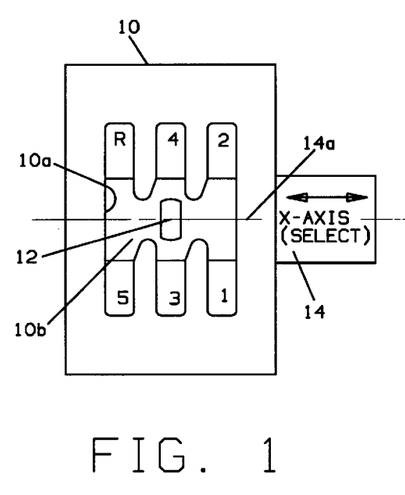
FIGS. 1 and 2 are a diagrammatic plan view and a cross sectional view, respectively, of a shift gate plate coupled to a control rod of an automotive manual transmission.
Figure 2:
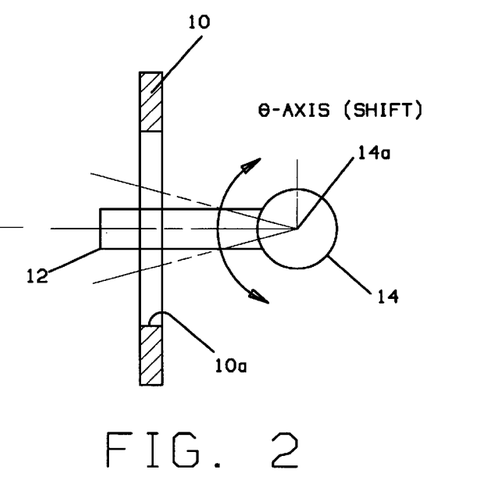

With reference to FIGS. 1 and 2, a shift gate plate 10 is formed with a cut-out 10a through which a selector pin 12 extends from a control rod 14. Cut-out 10a is formed with a central opening 10b providing a neutral zone extending along an X-axis in the direction of the longitudinal axis 14a with a plurality of pairs of notches extending in a direction parallel to a Y-axis, i.e., perpendicular to the X-axis, to provide gear shift zones at a selected locations along the X-axis. The control rod is translatable along, as well as rotatable about, the longitudinal axis so that the selector pin can move along the X-axis between opposite ends of the cut-out and, upon rotational movement of the control rod about axis 14a, the selector pin rotates (θ-axis) and is movable into any one of the notches depending upon the position of the selector pin along the X-axis. As seen in FIG. 1, selector pin 12 can move through neutral between one extreme position along the X-axis at gear states 1, 2, through a second position along the X-axis at gear states 3, 4 and an opposite extreme or third position along the X-axis at gear states 5, R.

Figure 3:
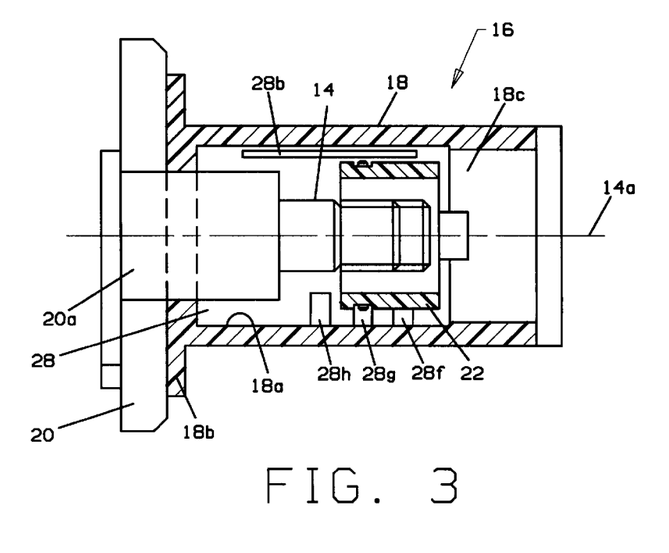
FIGS. 3 and 4 are a cross sectional and an end view, respectively, of a sensor apparatus made in accordance with the invention shown attached to the shift tower of an automotive manual transmission.
Figure 4:
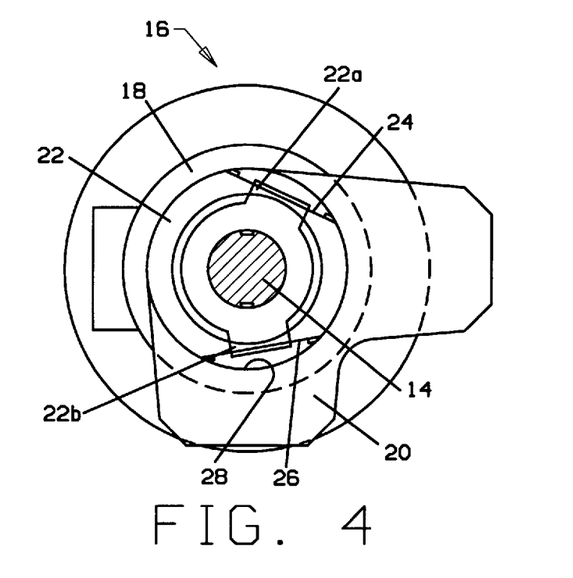
Figure 4A:
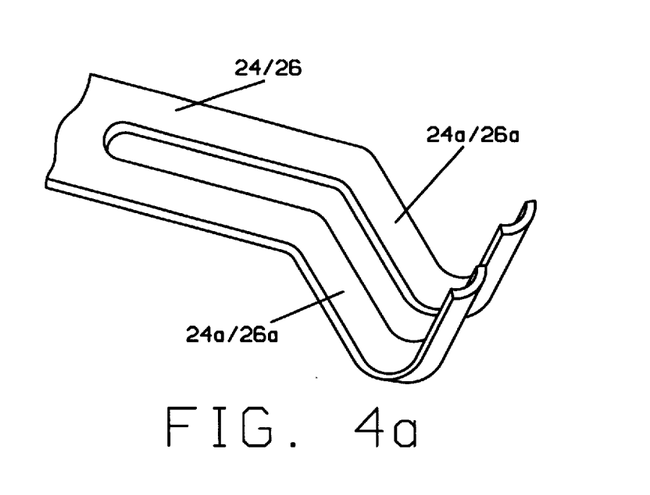
FIG. 4a is a fragmentary perspective of a distal end portion of a contact wiper of the FIGS. 3, 4 apparatus.

With reference to FIGS. 3 and 4, a position sensor apparatus 16 made in accordance with the a first embodiment of the invention is shown comprising a housing 18 having a generally cylindrical inner surface 18a for mounting a flexible substrate to be described below and may provide a bearing surface for a rotor assembly to be described and an end wall 18b for attachment, using conventional bolts or the like (not shown), to the shift tower 20 of an automotive manual transmission (not shown). At the base of the housing assembly 18, a suitable seal, such as a gasket (not shown), is preferably provided to create an environmental seal against a stationary base to protect internal components from fouling over the expected pressure differential and environmental conditions seen by the sensor, e.g., salt spray or other contaminants. Control rod 14 extends through a bore formed in boss 20a of the shift tower into a switch cavity 18c. A rotor 22 formed of electrically insulative material is fixedly mounted on control rod 14 and mounts thereon first and second electrically conductive wipers 24, 26. Wipers 24, 26 are formed of material have good spring characteristics as well as oxidation and corrosion resistance properties and are mounted on support platforms 22a, 22b respectively and are generally elongated strips having opposite cantilever mounted contact end surfaces biased toward the inside cylindrical surface 18a of the housing. Preferably the contact end surfaces are formed with a plurality of spring fingers 24a/26a as seen in FIG. 4a to provide redundant electrical engagement with any electrically conductive surface against which it is biased. Although FIG. 4a shows a bifurcated contact, it will be realized that any selected number of spring fingers can be employed, as desired.

Figure 5:
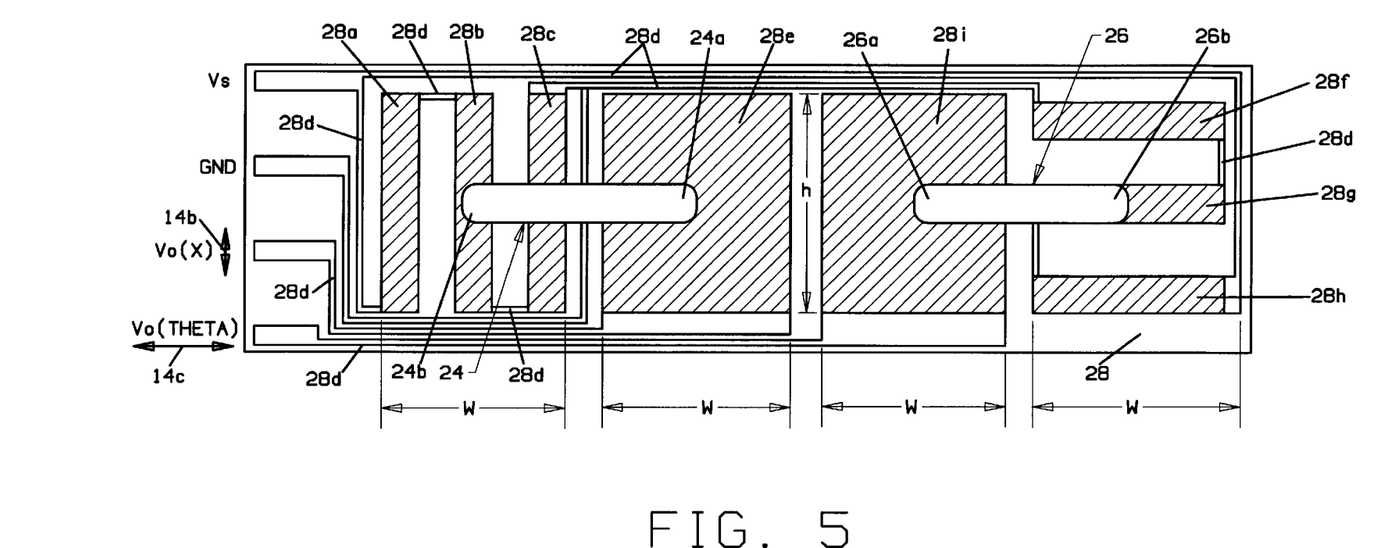
FIG. 5 is a top plan view of a flexible substrate shown in a flat condition prior to placement in the sensor housing and on which a resistive circuit used in the FIGS. 3 and 4 sensor is disposed along with a diagrammatic illustration of associated first and second contact wipers.
Figure 6:
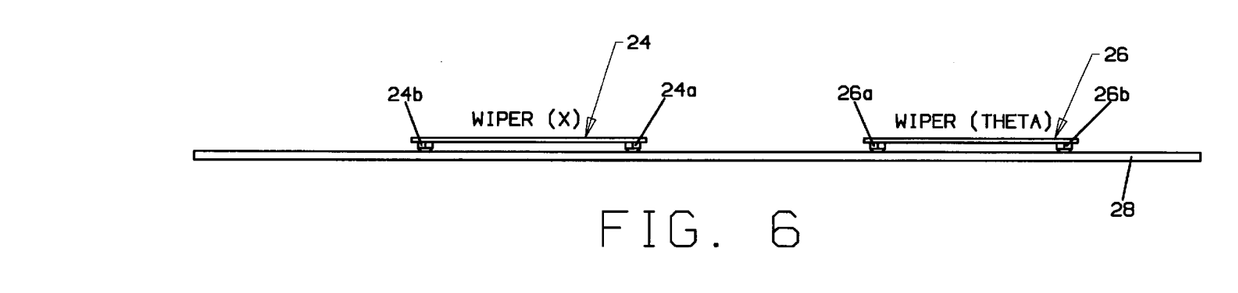
FIG. 6 is a front view of the FIG. 5 substrate and contact wipers.

An electrical circuit is disposed on the inside cylindrical surface 18a and preferably comprises a flexible substrate 28 of suitable electrically insulative materials such as polyimide film, as seen in FIGS. 5 and 6, on which first and second electrical resistive patterns are printed. The first resistive pattern comprises a plurality of elongated resistive elements 28a, 28b, 28c each extending in length in a first direction parallel to an X-axis, as denoted by arrow 14b, for a selected height h. Resistive elements 28a, 28b, 28c are serially connected by trace 28d between a voltage supply terminal Vs and a ground terminal GND. The resistive elements 28a, 28b, 28c together extend in an opposite or Y direction, as denoted by arrow 14c, a selected width w. A first contact pad 28e having a width generally equal to width w and a height generally equal to h is placed adjacent to the resistive elements and is connected to a first output terminal Vo(x) via trace 28d.

The second resistive pattern comprises first, second and third elongated resistive elements 28f, 28g, 28h extending in length in a second different direction, preferably 90° to the first direction, parallel to a Y-axis, as indicated by arrow 14c and are serially connected between voltage supply terminal Vs and ground terminal GND by trace 28d. The resistive elements each extend in length a distance w and taken together in height across from one another a distance h. A second contact pad 28i is disposed intermediate to first contact pad 28e and the resistive elements 28f–28h and has a size generally equal to w×h. Contact pad 28i is electrically connected to second output terminal Vo(θ)via conductive trace 28d. Wipers 24 and 26 are shown in FIGS. 5 and 6 placed at a central position relative to the resistive patterns. Housing 18 may be formed with a connector portion (not shown) having four terminal pins (not shown) to provide electrical connection to the terminals described above on flexible substrate 28. It will be understood that contact pads 28e, 28i are of low electrical resistance, as by providing an underlying coating of highly electrically conductive material so that the total resistance at any given position is determined essentially by the respective resistance elements. In like manner, traces 28d are of minimal electrical resistance.

As control rod 14 is moved along the X-axis, one distal end 24a of contact wiper 24 wipes along contact pad 28e in continuous electrical engagement and the opposite end 24b of wiper 24 wipes along the length of resistive element 28b in continuous electrical engagement changing the resistive value by virtue of changing the effective length of resistive element 28b. At selected locations of selector pin 12 along axis 14a the control rod 14 can be rotated about axis 14a, now serving as the θ-axis, so that selector pin 12 moves into a notch of the cut-out 10a with the wiper end 24b concomitantly moving out of electrical engagement with resistive element 28b and into electrical engagement with a portion of resistive element 28a or 28c. The value of the effective resistance of the first resistive pattern being dependent upon the location of wiper end 24b.

As control rod 14 moves along the X-axis, contact wiper 26 is also moving with contact wiper end 26a wiping along contact pad 28i in continuous electrical engagement therewith and contact wiper end 26b wiping across the widths of resistive elements 28f, 28g, 28h. When the control rod is rotated with selector pin 12 entering into one of the notches of cut-out 10a, contact wiper end 26b then wipes in continuous electrical engagement with one of the resistive elements 28f–28h depending upon the location of the control rod along the X-axis 14a.

Figure 7:
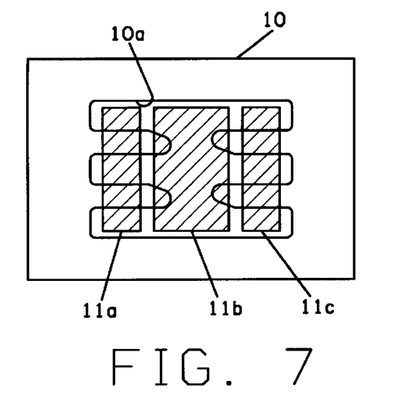
FIG. 7 is a diagram showing three zones related to the X-axis selector pin travel and transmission state events.
Figure 8:
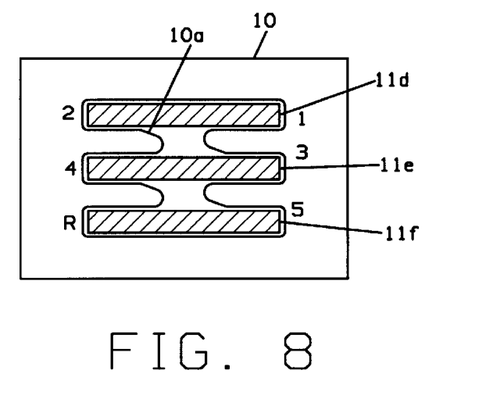
FIG. 8 is a diagram showing three zones relating to the Y or θ-axis selector pin travel and transmission state events.
Figure 9:
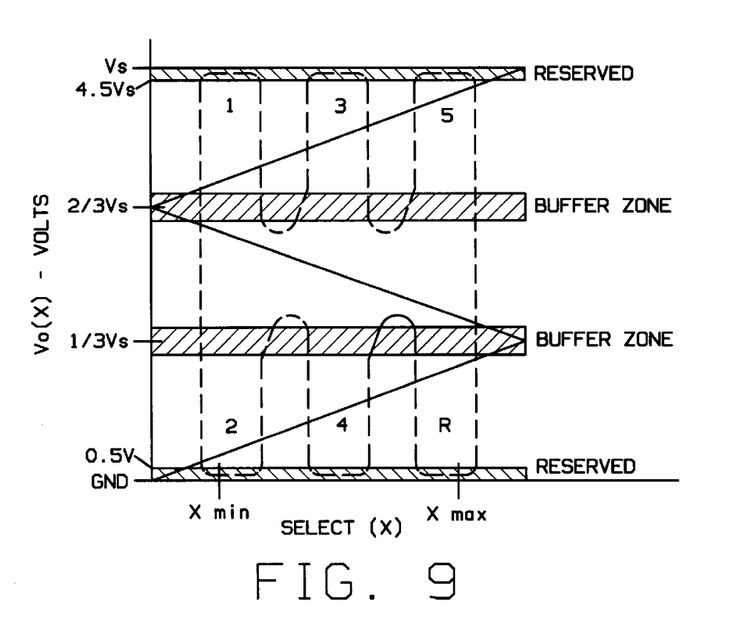
FIGS. 9 and 10 are diagrams illustrating voltage output of the X-axis pin and θ-axis pin, respectively, relative to the gear select state.
Figure 10:
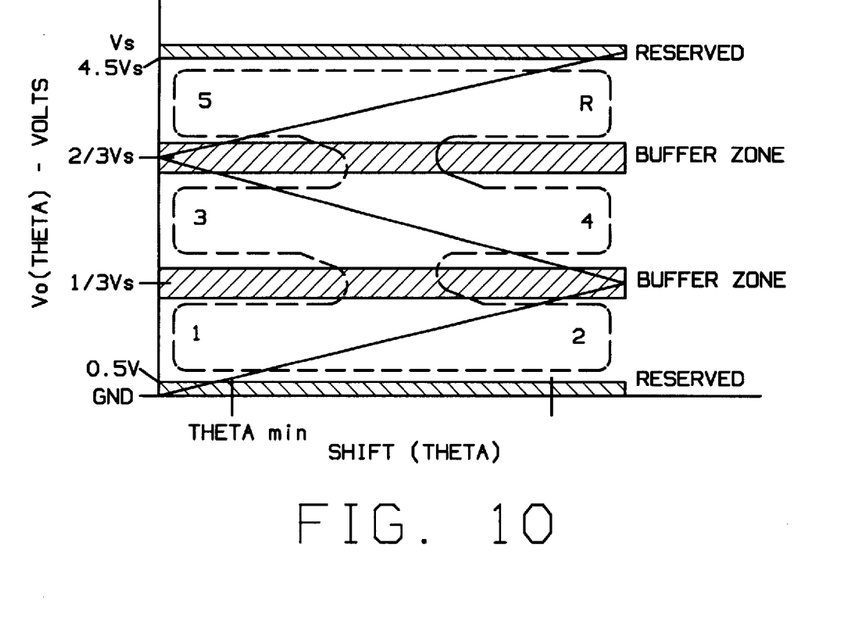
Figure 11:
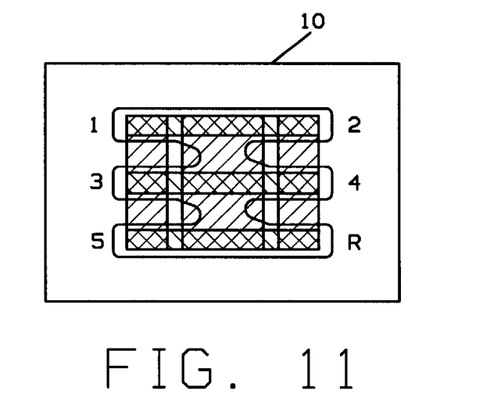
FIG. 11 is a diagram illustrating overlap zones on the shift pattern.
Figure 12:
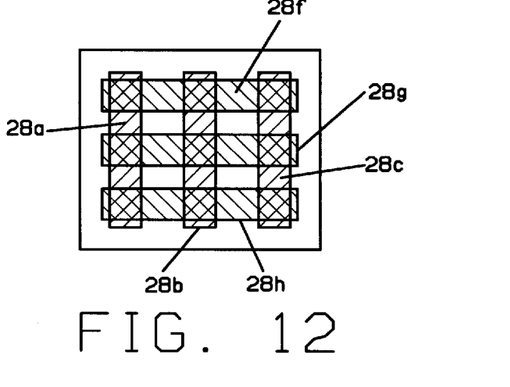
FIG. 12 is a diagram illustrating overlap zones of the first and second resistive patterns.
Figure 13:
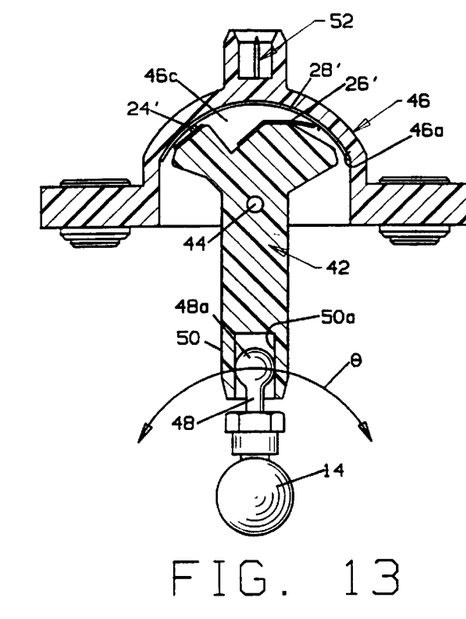
FIGS. 13 and 14 are simplified side and top views, respectively, with the housing shown in cross section, of a sensor apparatus made in accordance with a second embodiment of the invention.
Figure 14:
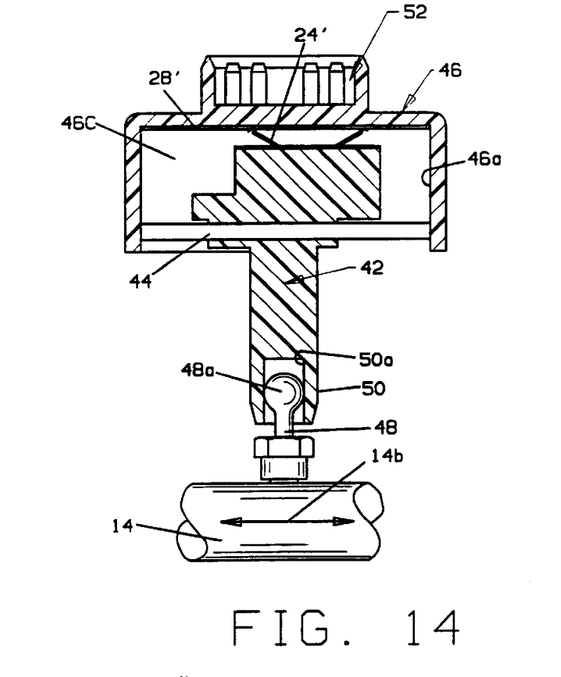

The position sensor takes advantage of the travel restrictions imposed by the cut-out portion pattern 10a of shift gate plate 10 and essentially divides each axis of movement into three discrete output bands which correspond to desired transmission states or zones as illustrated in FIGS. 7 and 8. FIG. 7 relates to translation along the X-axis and shows neutral zone 11b and gear engaging zones 11a, 11c respectively. FIG. 8 relates to rotation along the θ-axis and shows zone 11d including gear states 1, 2, zone 11e including gear states 3, 4 and zone 11f including gear states 5, R respectively. Due to the common or overlapping areas of the output bands the position sensor has direct cross checking capability whereby the position relative to one axis can be determined from the output of the other axis. The specific output of the Vo(x) and Vo(θ) in volts for a sensor made in accordance with the first embodiment is shown in FIGS. 9 and 10 respectively. The buffer zones are non-occurring output regions based on mechanical stack-up and circuit design. The reserved zones are output regions reserved for fault detection. It will be seen that each gear state, as well as neutral, has a different specific voltage output on each output terminal. Thus for gear state 3, for example, a voltage level approximately midway between supply voltage Vs and ⅔ supply voltage is obtained on the Vo(x) terminal and a voltage level of slightly under ⅔ voltage supply is obtained on the Vo(θ) terminal. This overlapping of discrete zones occurs in nine regions illustrated in FIGS. 11 and 12. FIG. 11 shows the overlap relative to the shift pattern while FIG. 12 shows the overlap by the resistive elements.

Figure 15:
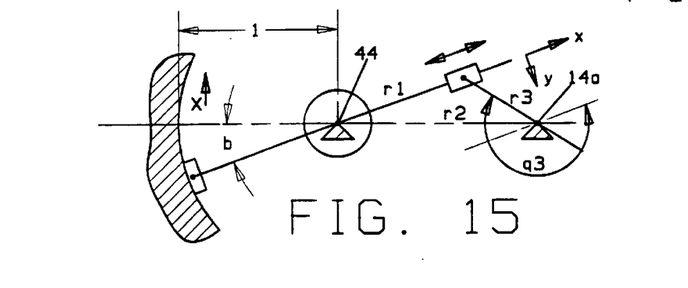
FIG. 15 is a diagram showing the mechanical linkage arrangement of a ball and socket mechanism employed in the second embodiment of the invention.
Figure 16:
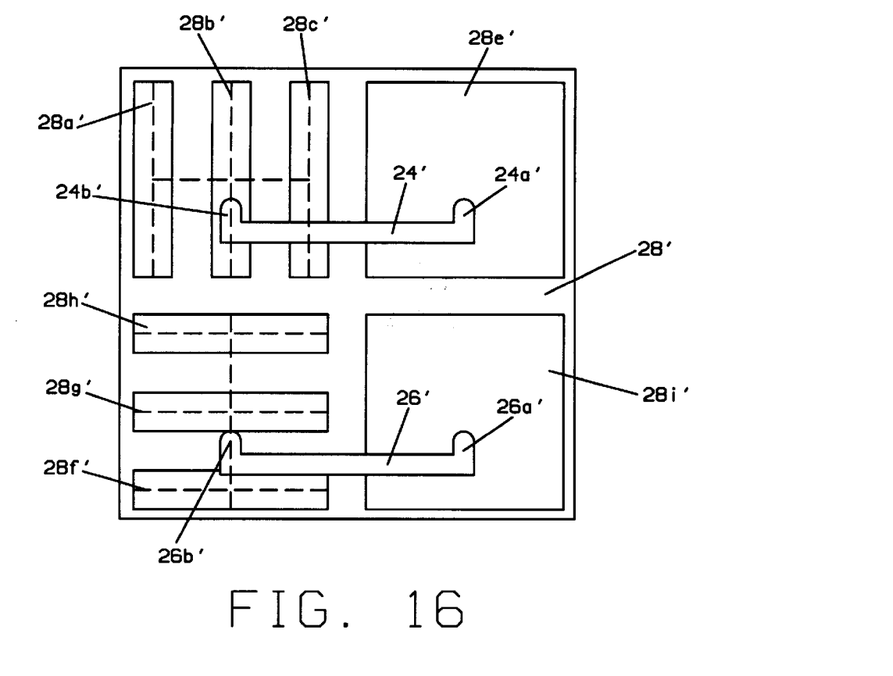
FIG. 16 is a top plan view of a layout of the resistive pattern and contact pads used in the FIGS. 13, 14 embodiment.

A position sensor 40 made in accordance with a second embodiment of the invention is shown in FIGS. 13–16 in which the rotor 42 is mounted for translation and rotation on a shaft 44 fixedly attached to housing 46 extending across a switch chamber 46c defined by an inside cylindrical surface 46a of the housing. A connecting pin 48 extends radially from control rod 14 having a spherical free end portion 48a which is slidingly received in a socket 50 having a generally cylindrical inside surface 50a. As control rod moves along the X-axis as indicated by arrow 14b in FIG. 14, rotor 42 will translate or slide along shaft 44 in a 1:1 ratio. As the control rod is rotated in a given direction as indicated by arrow 0, the spherical surface 48a will slide within cylindrical surface 50a and transfer motion to rotor 42 causing rotation in the opposite direction. Either type of movement of rotor 42 causes wiping action of contact wipers 24', 26' on substrate 28' in the same manner as described above in relation to the FIGS. 3–6 embodiment. The resistive pattern of flexible substrate 28' shown in FIG. 16 is slightly different in order to accommodate the housing and rotor. FIG. 16 is somewhat simplified in that the terminals and connecting circuit traces are not shown, however; it will be understood that they are the same as in FIG. 5 with resistive elements 28a', 28b'and 28c'of the first resistive pattern serially connected between supply voltage and ground and with contact pads 28e'connected to an X-axis output terminal. Resistive elements 28f', 28g'and 28h'are also serially connected between supply voltage and ground and with contact pad 28i'connected to a θ-axis output terminal. The several terminals are connected to connector portion 52 in a conventional manner.

Figure 17:
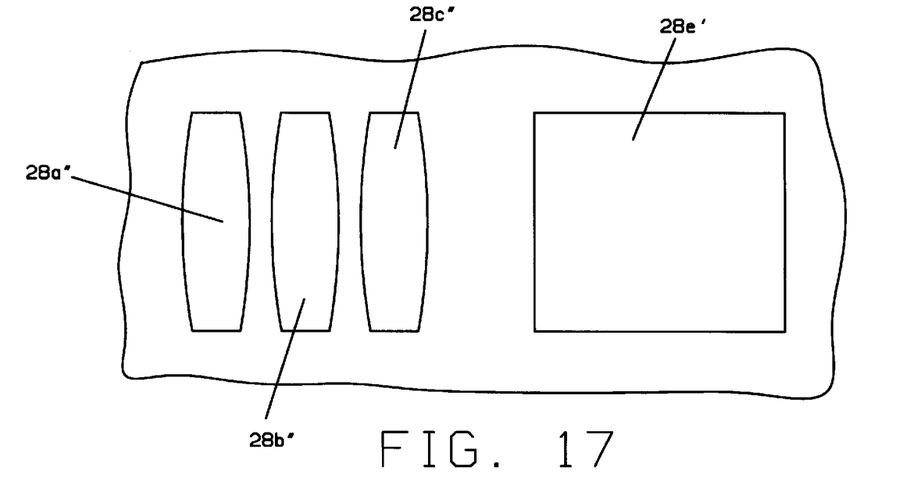
FIG. 17 is a plan view of resistive elements having a configuration to provide compensation for the non-linear effects of the ball and socket arrangement of the second embodiment.

FIG. 15 is a diagrammatic view illustrating the mechanical linkage of the ball and socket arrangement in which the radius from shaft 44 to the effective point of physical engagement between spherical surface 48a and cylindrical surface 50a, rl in FIG. 15, changes upon rotation of control rod 14 about axis 14a. This change introduces a non-linear effect in the shift (θ) axis. This can be compensated by contouring the resistive elements 28a'', 28b'', 28c''as shown in FIG. 17 with wider central portions than their respective end portions so that the resistance values relative to the various gear states will conform to the voltage output shown in FIG. 10.

It will be recognized that various modifications of the embodiments disclosed are possible within the scope of the invention claimed. For example, the ball and socket arrangement of FIGS. 13 and 14 could be reversed with the spherical surface 48a extending from rotor 42 and the cylindrical surface 50a formed on control rod 14, if so desired. Further, if desired, the output of the contact wipers could be permanently connected to the output terminal via a type of pigtail arrangement. Although a wiper and resistive circuits are employed in the specific embodiments described, it is within the purview of the invention to use non-contacting arrangements as well, such as optical or magnetic. Further, it is within the purview of the invention to utilize any two axes of movement where the axes are located at some known angle relative to each other, for example, first and second orthogonal translational movements. It is the intention that the appended claims be interpreted as broadly as possible in view of the prior art to include all such variations and modifications.

What is claimed:

1. Position sensor apparatus for providing an output signal corresponding to the position of a control rod of a shift tower mechanism of an automotive transmission comprising:

a control rod having a longitudinal axis and being movable along and rotatable about the longitudinal axis, a substrate having a first electrically resistive pattern comprising a plurality of elongated resistive elements serially connected to one another between a supply terminal and ground, a first contact pad connected to a first output pin, the resistive elements each extending generally parallel to a first direction, and a second resistive pattern comprising a plurality of elongated resistive elements serially connected to one another between the supply terminal and ground, a second contact pad connected to a second output pin, the resistive elements of the second resistive pattern each extending generally parallel to a second, different direction, a first electrically conductive wiper mechanically coupled to the control rod and movable therewith, the wiper having a first contact in continuous wiping engagement with the first contact pad and a second bridging contact in intermittent wiping engagement with each of the resistive elements of the first resistive pattern in dependence upon one of the angular position of the control rod about and the translational position along the longitudinal axis, a second electrically conductive wiper mechanically coupled to the control rod and movable therewith, the second wiper having a first contact in continuous wiping engagement with the second contact pad and a second bridging contact wiper in intermittent wiping engagement with each of the resistive elements of the second resistive pattern in dependence upon the other of the angular position of the control rod about and the translational position along the longitudinal axis.

2. Position sensor apparatus according to claim 1 further comprising a shift gate plate having a cut-out defining an elongated path along the first direction and a plurality of notches communicating with the elongated path and extending therefrom along the second direction generally perpendicular to the first direction, a selector pin connected to the control rod extending through the cut-out and movable along the elongated path and along the second direction into the plurality of notches, the elongated path corresponding to a neutral condition of the transmission and each of the notches corresponding to a different gear shift selection.

3. Position sensor apparatus according to claim 1 in which the first and second directions are generally perpendicular to one another.

4. Position sensor apparatus according to claim 1 in which the substrate is mounted in a housing having an inwardly facing cylindrical surface having a longitudinal axis and the substrate lies generally on the cylindrical surface, an electrically insulating rotor element is mounted coaxially with the control rod and the first and second contact wipers are mounted on the rotor element and biased into engagement with the substrate, the control rod having a longitudinal axis and being movable along the longitudinal axis corresponding to the first direction and being pivoted on the longitudinal axis of the control rod corresponding to the second direction.

5. Position sensor apparatus according to claim 1 further comprising a housing having a cylindrical surface area defining a chamber and having a longitudinal axis, the substrate being mounted on the cylindrical surface area, a rotor element rotatably and slidably mounted on a shaft having a longitudinal axis parallel to the longitudinal axis of the control rod, the first and second wipers being mounted on the rotor element and biased into engagement with the substrate, a pin extending radially from the control rod and a ball and socket mechanism in which the ball is slidably received in the socket connecting the pin and rotor so that rotation of the control rod in one angular direction will cause rotation of the rotor in an opposite angular direction.

6. Position sensor apparatus according to claim 5 in which the resistive elements of one resistive pattern each has opposed ends and an intermediate control portion which is configured to have a progressively greater width in a direction going from either end of a respective resistive element toward the central portion.

* * * * *